UNITED STATES PATENT OFFICE.

ADOLF PAULINUS ZAMORE, OF MÅNSBO, AND OSCAR FREDRIK CARLSON, OF LJUNGA VERK, SWEDEN, ASSIGNORS TO SAID CARLSON

METHOD OF TREATING LIME-NITROGEN.

1,042,746.   Specification of Letters Patent.   Patented Oct. 29, 1912.

No Drawing.   Application filed August 6, 1912. Serial No. 713,643.

*To all whom it may concern:*

Be it known that we, ADOLF PAULINUS ZAMORE, a subject of the King of Sweden, and resident of Månsbo, Avesta, in the Kingdom of Sweden, and OSCAR FREDRIK CARLSON, a subject of the King of Sweden, and resident of Ljunga Verk, Johannisberg, in the Kingdom of Sweden, have invented certain new and useful Improvements in the Method of Treating Lime-Nitrogen, of which the following is a specification.

The lime nitrogen (calcium cyanamid) which is obtained by heating calcium carbid in a nitrogen atmosphere, is after having been ground a very caustic and dusting powder which is difficult to deal with as well during transportation as when it is employed as a fertilizer. Several methods have been proposed to remove this causticity and dustiness, for instance by means of water, oil, water and oil, carbonic acid and water, etc. One has also proposed to treat the lime nitrogen with moist nitrous gases, and also to treat the same with nitric acid, containing 50 per cent. of $HNO_3$. All these methods, however, are effected with a great deal of inconvenience. The treatment with nitrous gases requires a complicated system of apparatus and is difficult to carry out; furthermore, nitrite is also formed hereby. When treating the lime nitrogen with nitric acid containing 50 per cent. or more of $HNO_3$ great quantities of nitrous gases are formed.

The present invention now refers to a method of treating lime nitrogen with a mixture of nitric acid and water in such proportions that the mixture will correspond to a diluted nitric acid containing 3–25 per cent. of $HNO_3$. A suitable quantity of this diluted acid to be added to the lime nitrogen is 15–50 per cent. of the weight of the lime nitrogen. By using such a diluted acid the increasing of the temperature is very little, and by regulating the temperature of the mass during the reaction between acid and lime nitrogen by cooling one can obtain the result that very little or no ammonia is generated, and that a very inconsiderable quantity of dicyan-diamid is formed. The product will also be free from nitrite. The method can be performed by means of suitable apparatus, such as mixing screws, mixers with rotating arms or by a combination of such apparatus. After the mass has been treated in said apparatus with the above mentioned acid it may be left standing for some time and thereafter be passed through another apparatus for crushing lumps which may have been formed.

The lime nitrogen treated in this manner can be obtained as a non-dusting powder, which does not dust, even if it has been stored for a considerable time; this is not the case with lime nitrogen having been treated according to known methods. Furthermore, the product is not caustic wherefore it can be manipulated very easily.

When used as a fertilizer the product offers great advantages on account of the fact that it contains ready-formed nitrate-nitrogen, and hereby it has the advantages of lime nitrogen and Chile saltpeter without being affected with the inconveniences of the same.

Having now described our invention, what we claim as new and desire to secure by Letters Patent is:

1. The herein described method of treating lime nitrogen which consists in adding to the same 15–50 per cent. by weight of diluted nitric acid containing 3–25 per cent. of $HNO_3$, substantially as described and for the purpose set forth.

2. The herein described method of treating lime nitrogen which consists in adding to the same 15–50 per cent. by weight of a diluted nitric acid containing 3–25 per cent. of $HNO_3$ and cooling the mass during the treatment, substantially as described and for the purpose set forth.

In witness whereof, we have hereunto signed our names in the presence of two subscribing witnesses.

ADOLF PAULINUS ZAMORE.
OSCAR FREDRIK CARLSON.

Witnesses to the signature of A. P. Zamore:
CARL AXEL FREDRIK EHRNER,
KANN AF. TROLLE.

Witnesses to the signature of O. F. Carlson:
AXEL SODERFUND,
HILDING JOHANSSON.

---

Copies of this patent may be obtained for five cents each, by addressing the "Commissioner of Patents, Washington, D. C."